Feb. 25, 1930.　　　J. A. PETERSON　　　1,748,243
FEEDING AND CUTTING MACHINE
Filed April 23, 1928　　3 Sheets-Sheet 1
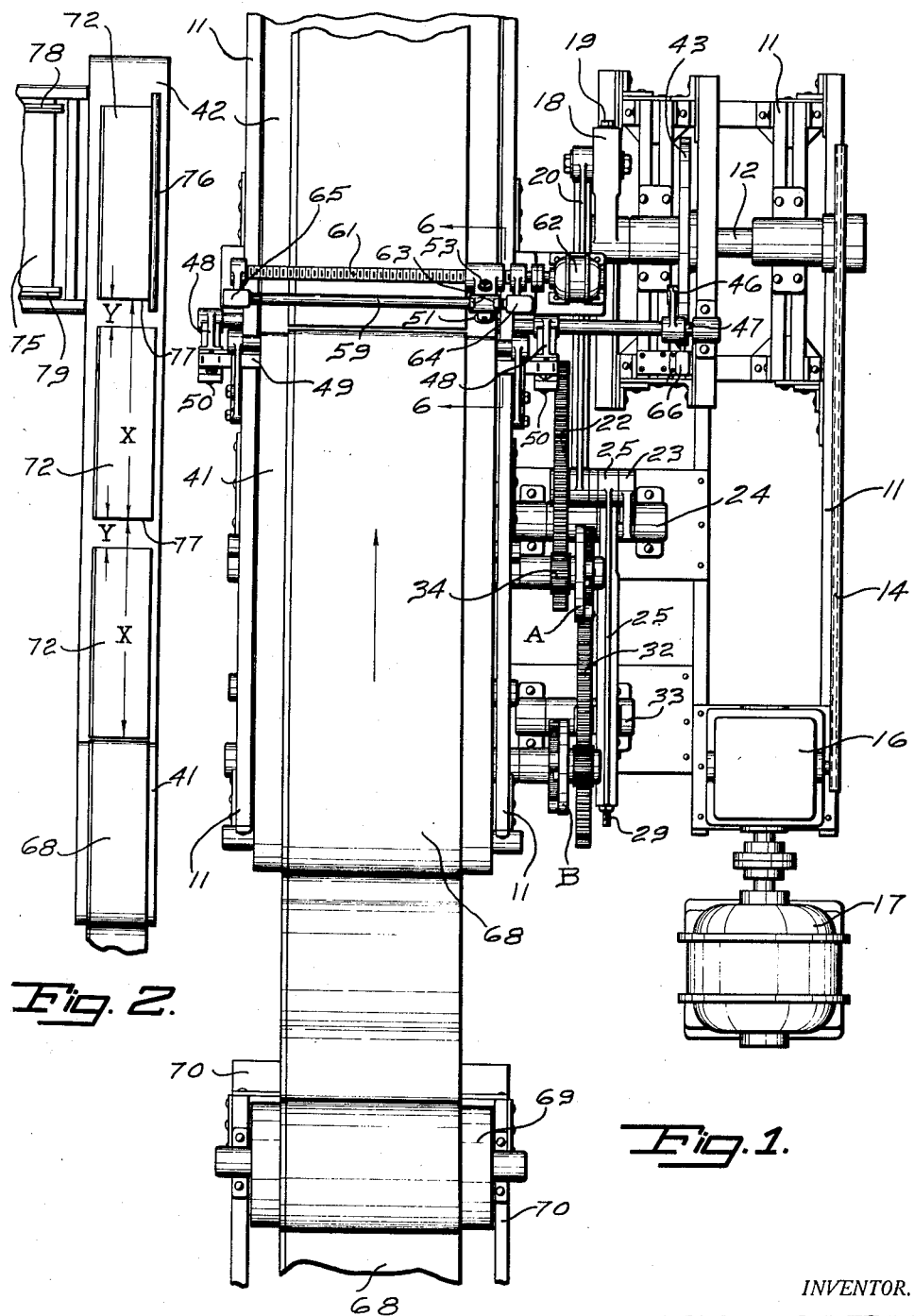
INVENTOR.
JOHN A. PETERSON.
BY
ATTORNEY.

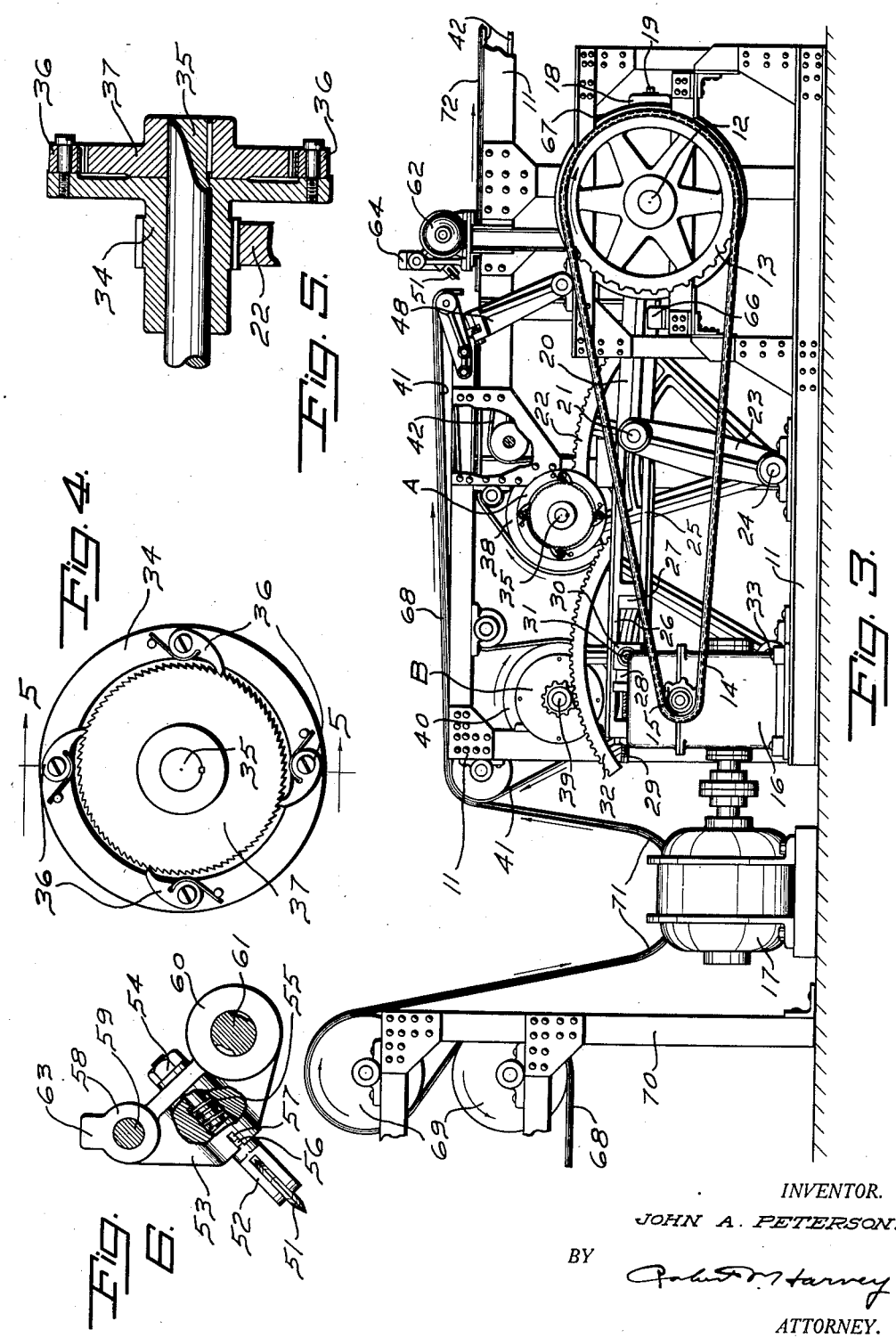

INVENTOR.
JOHN A. PETERSON.
BY
ATTORNEY.

Patented Feb. 25, 1930

1,748,243

UNITED STATES PATENT OFFICE

JOHN A. PETERSON, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

FEEDING AND CUTTING MACHINE

Application filed April 23, 1928. Serial No. 272,024.

My invention relates to machines for feeding and cutting sheeted material and more particularly to machines of such character for manipulating rubber stock used in the manufacture of inner tubes for pneumatic tires and the like.

It is among the objects of my invention to provide a machine which will automatically advance an accurate length of sheeted material, sever the material to form a blank, advance the blank an accurate distance from the severed end of the sheeted material, successively repeat these operations to produce a series of accurately measured and accurately spaced blanks, and deliver these blanks into accurate position in relation to apparatus constituting the next manufacturing operation. Prior to my invention machines of this character were inaccurate in respect to the latter and such adjustments as could be made were difficult to obtain. Another object of my invention is to provide a machine of this character which is simple in construction and will have a low maintainance cost. Other and further objects will be apparent from the following specification and claims.

In the accompanying drawings which illustrate one embodiment of my invention,

Fig. 1 is a plan view of the machine;

Fig. 2 is a partial plan view on a smaller scale showing the stock carrying conveyors and a partial view of an associated inner tube manufacturing machine;

Fig. 3 is a side elevation of the machine;

Fig. 4 is an enlarged view of the pawl and ratchet arrangement for the conveyor or driving rolls;

Fig. 5 is a sectional view taken on the line 5—5 of Fig. 4;

Fig. 6 is a sectional view taken on the line 6—6 of Fig. 1;

Figure 8:
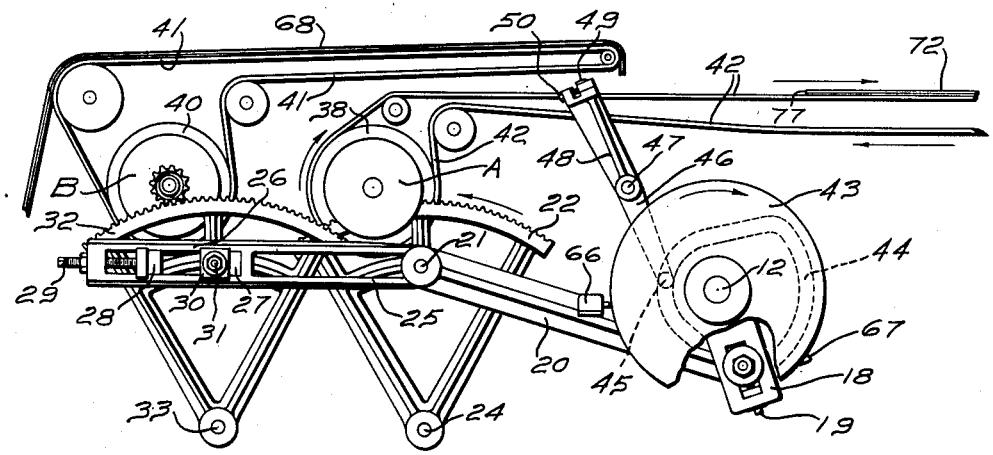
Fig. 8 is a detail view of the working parts of the machine showing the positions they would occupy after the blank has been advanced for spacing.

Referring to the drawings, 11 designates the framework of the machine upon which is journaled a driving shaft 12. On one end of this shaft 12 is keyed a sprocket 13 driven by a chain 14 meshing with a sprocket 15 connected to a reduction unit 16 which is in turn connected to an electric motor 17. The other end of shaft 12 is keyed to a crank 18 (see Fig. 8) bearing an adjusting screw 19 by which its stroke may be varied, and is linked by connecting rod 20 to a stud shaft 21, journaled to a segmental gear 22 at one end and at the other to a strengthening member 23 (see Figs. 1 and 3), both of which are in turn pivoted to the frame 11 at 24. Pivotally mounted on the stud shaft 21 is a link 25 bearing parallel guideways 26 in which are positioned a fixed stop 27 and a movable stop 28 adapted to be adjusted by a screw 29. A slide 30 attached by stud 31 to a segmental gear 32, pivoted to the frame 11 at 33, is mounted in guideways 26 between stops 27 and 28 forming a lost motion connection between segment 32 and shaft 12.

Figure 9:
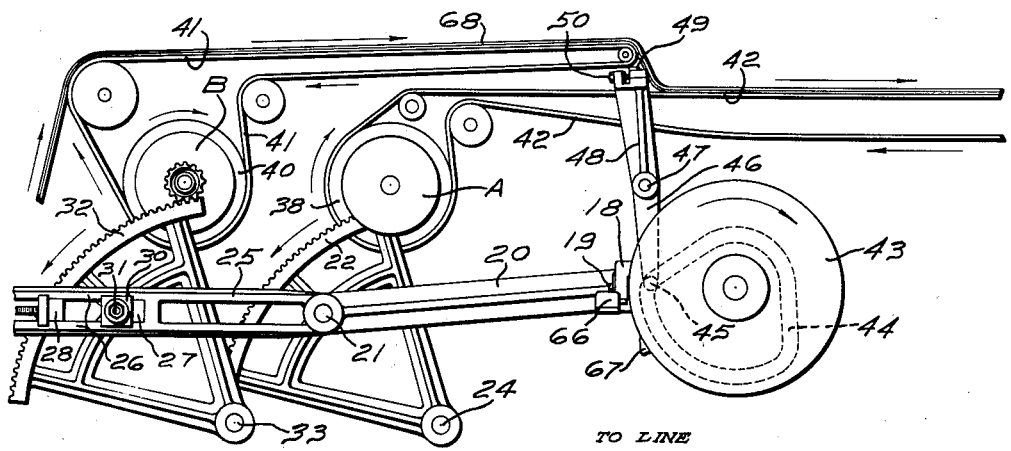
Fig. 9 is a view similar to Fig. 8 showing the end of the conveyor movements with the inner tube stock ready to be cut.
Figure 10:
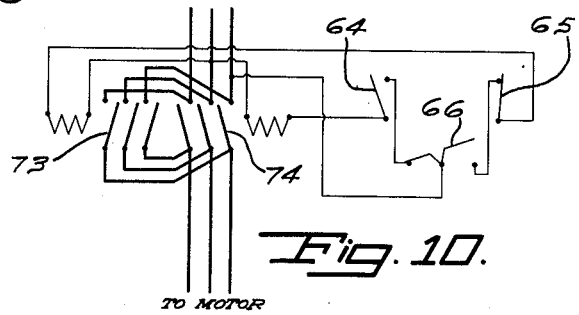
Fig. 10 is a diagram of the electrical circuit used to control the automatic cutter.

It will be apparent from the foregoing description that a constant rotation of the crank 18 in the direction of the arrows in Figs. 3, 8 and 9 will impart a rocking motion to the segmental gear 22 and a delayed rocking motion of lesser degree to the segmental gear 32 the extent of the delay being governed by the distance between stops 27 and 28.

Geared to the segmental gear 22 is a gear 34 (Figs. 1 and 5) loosely mounted on a shaft 35 and bearing pawls 36 (Fig. 4) which are positioned to act on a ratchet 37 keyed to the shaft 35. This pawl mechanism which will hereafter be designated as unit A will, due to the rocking of segmental gear 22, impart to the shaft 35, to which is secured a conveyor driving roll 38, an intermittent motion only in the direction shown by the arrow (Fig. 3). Segmental gear 32 is similarly geared to a pawl unit B identical in every respect to unit A, but turned end for end on a shaft 39 bearing a conveyor driving roll 40 which is thus intermittently driven in the direction designated by the arrow (Fig.

3). As the roll 40, pawl unit B and segmental gear 32 are of the same respective dimensions as roll 38, pawl unit A, and segmental gear 22, the conveyor belt 41 driven by roll 40 and the conveyor belt 42 driven by roll 38 have, when in motion, the same surface speeds.

Keyed to drive shaft 12, intermediate crank 18 and sprocket 13, is a cam 43 bearing a cam groove 44 in which rides a cam roller 45 attached to an arm 46 secured to a shaft 47 pivoted in frame 11. Also attached to pivot shaft 47 are arms 48 supporting a cutter bar 49 which is adjusted to meet the cutter 51 (Fig. 7) by adjusting screws 50. As will be apparent from Figs. 8 and 9 a rotation of the cam 43 will, due to the action of cam groove 44 and cam roll 45, cause the arms 48 carrying the cutter bar 49 to oscillate from their positions in Fig. 8 to the cutting position shown in Figs. 7 and 9.

Figure 7:
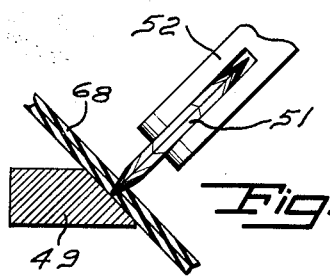
Fig. 7 is a detail view of the cutter in action.

The cutter 51 is mounted in a forked member 52 which is assembled to a carriage 53 (see Figs. 1 and 6) by a nut 54 and a compression spring 55 which serves to give the cutter a yieldable pressure on the cutter bar 49 (Figs. 6 and 7). A pin 56 formed on the member 52 engages with a groove 57 formed in carriage 53 to prevent any twisting action of the knife. The carriage 53 bears a collar 58 loosely fitted to a guide shaft 59 and also a nut 60 engaging a lead screw 61 directly connected to a reversible electric motor 62 mounted on the frame 11. Formed on the collar 58 are lugs 63 positioned so as to operate limit switches 64 and 65 mounted on the frame 11. A two-way switch 66 of a standard type operated by a push rod so as to shift its polarity at each depression of the rod is also mounted on frame 11 to engage a lug 67 on the periphery of cam 43, see Figs. 8 and 9.

The operation of the machine is as follows. An endless sheet of inner tube stock 68 is delivered from a calender, not shown in the drawings, to cooling rolls 69 supported on a suitable frame 70 and then to a supply loop 71. The speed of the calender and cooling rolls is adjusted to maintain this loop 71 at practical working levels as the conveyor belt 41 advances the stock. As the crank 18 rotates from the position shown in Fig. 3 to the position shown in Fig. 8 the segmental gear 22 is rocked and acting through pawl unit A drives the conveyor 42 to space the previously cut blank 72 as designated by the arrows in Fig. 8. During this period segmental gear 32 has remained stationary, but as the crank 18 continues to rotate the stop 28 engages the slide 30, thus rocking it and causing the conveyor 41 to advance in unison with conveyor 42 until the end of the advancing stroke of the crank 18 as shown in Fig. 9. A further rotation of the crank 18 rocks the segmental gears 22 and 32 back to their starting position without rotating the rolls 40 and 38 due to the action of pawl units A and B. During this period of operation the cam groove 44 acting on cam roller 45 has moved the cutter bar 49 into cutting position and immediately following this the cam 67 operates switch 66 to complete a circuit through limit switch 65 and solenoid switch 73 which is connected in the line and may be placed at any convenient wiring position, not shown in the drawings, to start the motor 62 which drives the cutter carriage 53 away from limit switch 64 across the cutter bar 49 to sever the stock 68 and finally to open the limit switch 65 to stop the motor. The limit switch 64 is now closed and as the switch 66 is operated by the cam 67 in its next revolution it completes a circuit through solenoid switch 74 similar to switch 73, starting the motor in the opposite direction to drive the cutter carriage, cut the stock and open limit switch 64. From the foregoing it will be apparent that the stock 68 is cut first in one direction and then the other forming the blanks 72 on the conveyor belt 42.

The blanks 72 (Fig. 2) are positioned by conveyor belt 42 in front of an associated tube building machine 75 bearing a fixed trimming knife 79 and an adjustable trimming knife 78 and are rolled on a tube manufacturing mandrel 76 which is then rolled to the machine 75 and the knives 78 and 79 trim the rolled stock to the desired length. An adjustment of the stroke of crank 18 by adjusting screw 19 will vary the amount of advance of conveyor 42 as designated by the distance X (Fig. 2) to advance or retard the delivery point of the rear edge 77 of the blanks 72 to position the said edge 77 in relation to the fixed trimming knife 79. The space between the blanks 72 as designated by Y (Fig. 2) is governed by the adjusting screw 29 on the link 25 and it is evident that as the space Y is made greater or smaller the blanks 72 are made respectively shorter and longer. By the use of this adjustment any setting of the adjustable trimming knife 78 will be taken care of to produce a minimum of stock waste due to trimming.

Having thus described my invention, I claim:

1. In combination, a conveyor adapted to advance a web of material, a second conveyor adapted to receive the advancing end of the web from the first conveyor, cutting mechanism positioned between the conveyors to sever blanks from the web, pivoted segmental gears respectively driving said conveyors intermittently in one direction, a crank operatively linked to the segmental gear driving the receiving conveyor, a lost motion device connecting the segmental gears and means rotatable with the crank to operate the cutting mechanism during the idle return stroke of the gear segments.

2. A device as recited in the preceding claim together with means for adjusting the stroke of the crank to adjust the advance of the receiving conveyor to position the severed blanks accurately at a delivery point and means for adjusting the lost motion device to adjust both the spacing of the blanks and the length of the blanks.

3. In a device of the character described, means for severing the sheeted material comprising a cutter bar, a cam to move the cutter bar from a rest position to a cutting position, a reversible electric motor, a lead screw connected to the motor, a cutter bearing carriage engaging with the lead screw and means for controlling the electric motor so that as the cutter bar is successively brought into cutting position the motor, through the lead screw, drives the cutter across the cutter bar to sever the sheeted material and on the next cut to travel in the opposite direction to sever the material.

JOHN A. PETERSON.